June 19, 1945.  J. IRWIN, JR  2,378,554
POWER SAW FOR FELLING AND CUTTING PULPWOOD
Filed Dec. 31, 1943  2 Sheets-Sheet 1
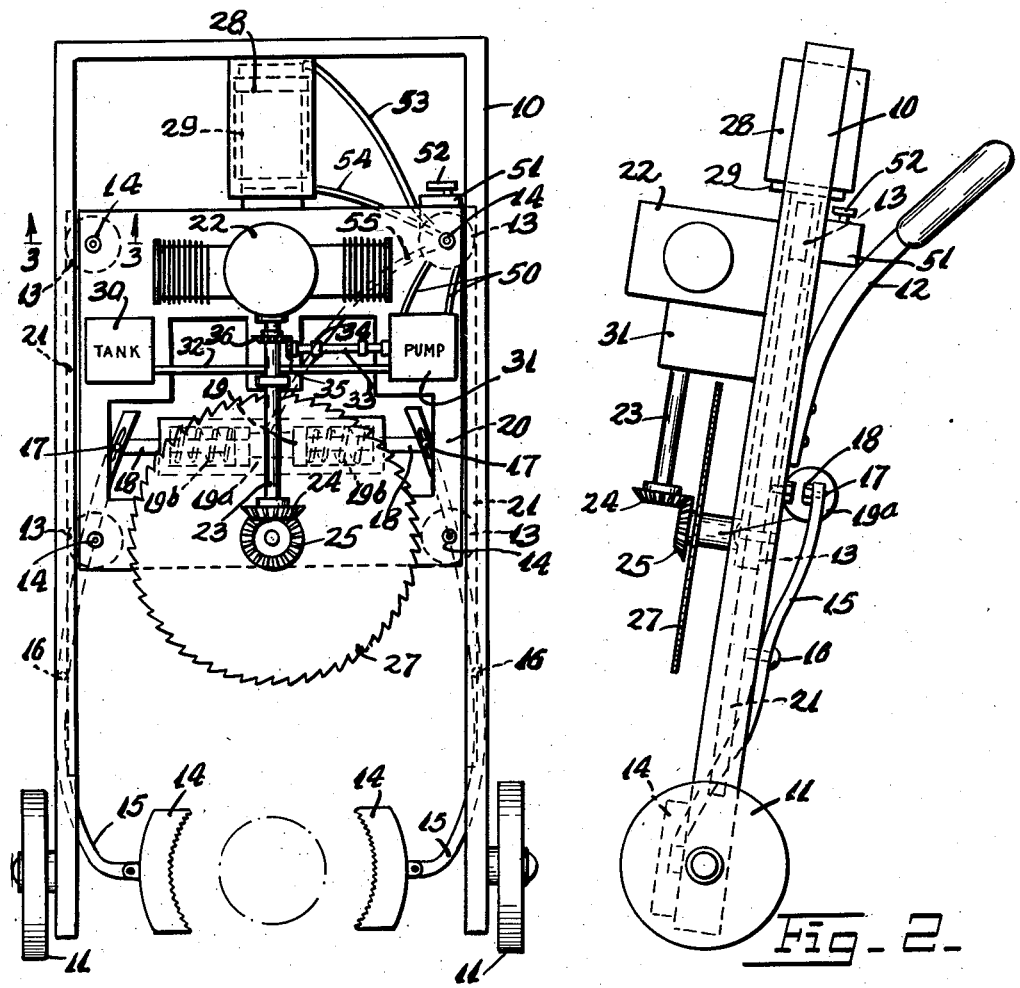
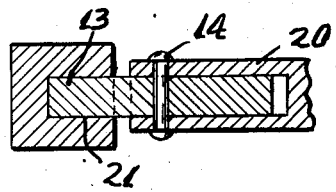
INVENTOR.
John Irwin, Jr.
BY
ATTORNEY

Patented June 19, 1945

2,378,554

UNITED STATES PATENT OFFICE 2,378,554

POWER SAW FOR FELLING AND CUTTING PULPWOOD

John Irwin, Jr., New York, N. Y.

Application December 31, 1943, Serial No. 516,325

3 Claims. (Cl. 143—43)

This invention relates to new and useful improvements in a power saw for felling and cutting pulpwood, timber, lumber, etc.

More specifically, the invention proposes the construction of a power saw for felling and cutting pulpwood, etc., characterized by a frame provided with wheels permitting the frame to be rolled over the ground and provided with a clamp and a saw arranged in a manner to permit a clamp to be engaged about the trunk of a tree to be cut with a means for driving the saw to cut the tree at a slight distance above the clamp.

A further object of the invention proposes the provision of a slide movably mounted on the frame and having the saw rotatively mounted thereon with the provision of a gasoline motor on the slide arranged in a manner to drive the slide.

A further object of the invention proposes the provision of a novel means arranged between the frame and slide in a manner to urge the slide towards the tree to move the saw into the cut being formed thereby.

Still another object of the invention proposes forming the frame of separate sections pivotally connected together with the saw being mounted on one of the sections while the clamp is mounted on the other section in a manner to permit the angular position of the saw to be adjusted with relation to the clamp to form an angular cut in the tree and control the direction in which the tree will fall when cut.

For further comprehension of the invention, and of the objects and advantages thereof, reference will be had to the following description and accompanying drawings, and to the appended claims in which the various novel features of the invention are more particularly set forth.

In the accompanying drawings forming a material part of this invention:

Fig. 1 is a front elevational view of a power saw constructed in accordance with this invention.

Fig. 2 is a side elevational view of Fig. 1.

Fig. 3 is an enlarged partial vertical sectional view taken on the line 3—3 of Fig. 1.

Figures 4, 5:
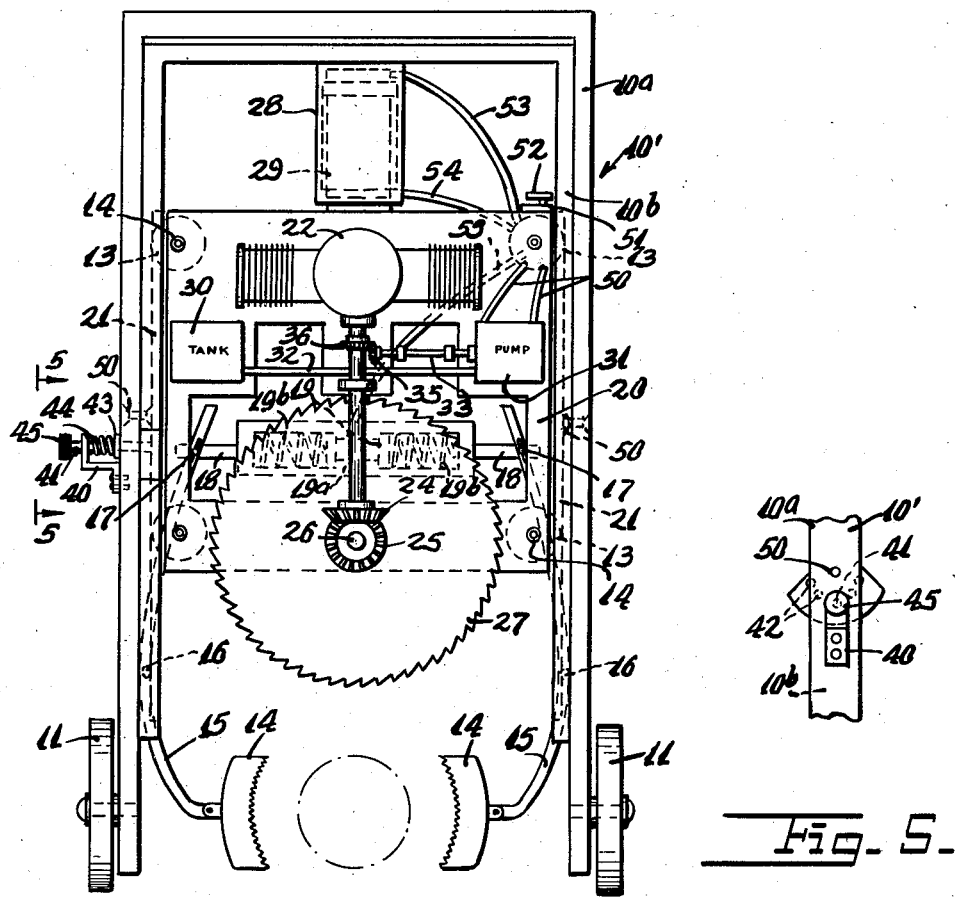
Fig. 4 is a view similar to Fig. 1 but illustrating a modification of the invention.
Fig. 5 is a partial side elevational view looking in the direction of the line 5—5 of Fig. 4.

The power saw for felling and cutting pulpwood, according to this invention, includes a frame 10 of U-shape and having wheels 11 rotatively mounted upon the free ends of the arms thereof. The side arms of the frame 10 are provided with handles 12 which are adapted to be manually gripped for rolling the frame 10 over the ground upon the wheels 11.

A clamp is mounted upon the front end of the frame 10 for engaging about the trunk of a tree to be cut. This clamp comprises a pair of opposed jaws 14 pivotally supported upon arms 15 extending along the side arms of the frame 10. The arms 15 are pivotally supported intermediate of their ends upon pins 16 which pass through arms 15 and engage the side arms of the frame 10. The free ends of the arms 15 are pivotally attached by means of pins 17 to the end of arms 18 extended from pistons 19 mounted within a hydraulic cylinder $19^a$. Springs $19^b$ are mounted within the hydraulic cylinder $19^a$ and are arranged in a manner to urge the piston 19 into a retracted position within the cylinder $19^a$ to pivot the arms 15 to spread the jaws 14 and permit a tree trunk to be engaged in position between these jaws. Hydraulic means which will be hereinafter considered, is provided for spreading the pistons 19 within the hydraulic cylinder $19^a$ to close the jaws 14 securely in position upon diametrically opposite sides of the tree trunk.

A slide 20 is movably mounted on the frame 10 to move towards the tree engaged by the clamp 14. The slide 20 has its side edges slidably supported in grooves 21 cut in the side arms of the frame 10. More specifically, the corners of the slide 20 are provided with wheels 13 rotatively supported on pins 14 and which engage the grooves 21.

A gasoline engine 22 is mounted upon the back of the slide 20 and has an extended driven shaft 23 which carries a bevel gear 24. The bevel gear 24 in turn meshes with a bevel gear 25 fixedly mounted upon a stud shaft 26 rotatively supported adjacent the front edge of the slide 20. A circular saw 27 is concentrically mounted upon the stud shaft 26 to be driven by the gasoline engine 22. Movement of the slide 20 towards the tree will cause the saw 27 to form a cut in the side of the tree.

A hydraulic means is provided for urging the slide 20 towards the clamp. This means comprises a hydraulic cylinder 28 mounted upon the intermediate arm of the U-shaped frame 10 and which slidably encloses a piston 29 which is extended from the cylinder 28 and which is attached to the rear portion of the slide 20. A tank 30 for hydraulic fluid is mounted on the slide 20 and connected with a fluid pump 31 also mounted on the slide 20 by means of a pipe 32. The pump 31 has an extended shaft 33 rotatively supported in brackets 34, extending from the slide 20. A bevel gear 35 is mounted upon the extended end of the shaft 33 and meshes with a complementary bevel gear 36. The bevel gear 36 is mounted on the driven shaft 23 of the gasoline engine 22 for the purpose of driving the shaft 33 to operate the pump 31 when the saw 27 is rotated.

The pump 31 has extended pipe lines 50 which pass to a valve 51 mounted upon the side arm of the frame 10 adjacent one of the handles 12. The valve 51 is provided with a controllable knob 52 for supplying the hydraulic fluid to pipe lines leading from the valve 51. One pipe line 53 leads to the back end of the cylinder 28 to extend the piston 29 therefrom. Another pipe line 54 leads from the valve 51 to the front end of the cylinder 28 to urge the piston 29 into the cylinder 28. Still another pipe line 55 leads from the valve 51 to the center of the hydraulic cylinder 19ᵃ to force hydraulic fluid into this cylinder and spread the piston 19 against the action of the springs 19ᵇ. The valve 51 is adapted to be controlled by the knob 52 for directing the hydraulic fluid under pressure from the pump 31 into either of the branch pipes 53, 54 or 55 for supplying the hydraulic fluid to the cylinders 28 and 19ᵃ at the proper times.

The operation of the device is as follows:

The lumberman is capable of moving the power saw from tree to tree by gripping the handles 12 and rolling the device on the ground on the wheels 11. When a tree is approached which is to be cut, the gasoline motor 22 is started for operating the pump to pump fluid through the valve 51 to the cylinder 19ᵃ to urge the clamp members 14 together to grip the tree trunk. The gasoline engine 22 which is in operation will when the valve 51 is further adjusted rotate the saw 27 and simultaneously force hydraulic fluid into the cylinder 28. This will move the slide 20 towards the tree and with the saw 27 operating the tree will be cut from the trunk at a point slightly above the jaws 14. Upon completing the sawing operation the valve 51 is adjusted to disengage the jaws 14 from the tree trunk and the power saw may be moved to the next tree where the above procedure is repeated.

The cut tree lying on the ground may then be cut to smaller parts by this device, which may be held straddled above the cut tree in a vertical plane and the above procedure is repeated.

In the form of the invention shown in Figs. 4 and 5 the frame 10' is formed of separate interengaged sections 10ᵃ and 10ᵇ. The clamp and the wheels 11 are mounted on the outer section 10ᵃ and the slide 20 with its associated parts are mounted upon the inner section 10ᵇ. The sections 10ᵃ and 10ᵇ are pivotally connected together by means of rivets 50 permitting the angular position of the saw 27 with relation to the clamp to be adjusted to form angular cuts in the side of the tree to control the direction in which the tree will fall. This procedure is fully understood by those skilled in the art and details will not be given in this specification.

Means is provided for locking the sections 10ᵃ and 10ᵇ in various pivoted positions with relation to each other. This means comprises a bracket 40 mounted on the side of the outer section 10ᵃ and which slidably supports a pin 41 which passes through the side arm of the outer section 10ᵃ and which is adapted to be selectively engaged with one of a plurality of complementary openings 42 formed in the adjacent side arm of the inner section 10ᵇ. A collar 43 is mounted upon the pin 41 and an expansion spring 44 operates between the adjacent faces of the collar 43 and the bracket 40 for urging the pin 41 into a position in which it will maintain its engaged position with one of the openings 42.

A knob 45 is mounted on the outer end of the pin 41 by which the pin 41 may be gripped for pulling outwards thereon against the action of the spring 44 for disengaging the pin from its respective opening 42, permitting the sections 10ᵇ to be pivoted relative to the section 10ᵃ.

In other respects this form of the invention is similar to that previously shown and like reference numerals identify like parts in each of the several views.

It is to be understood that this device may be actuated by a suitable mechanical, manually driven or air actuated means, as desired.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. A power saw for felling and cutting up pulpwood, comprising a frame with wheels for being moved along the ground, a clamp for clamping about a tree and mounted on the front end of said frame, a slide movably mounted on said frame to move towards said tree, an engine driven saw on said slide for cutting said tree, and hydraulic means for moving said slide towards said tree, said hydraulic means being characterized by a cylinder and piston arranged between said frame and slide, and a means driven by the mechanism for driving said engine driven saw for supplying hydraulic fluid to said cylinder under pressure.

2. A power saw for felling and cutting up pulpwood, comprising a frame with wheels for being moved along the ground, a clamp for clamping about a tree and mounted on the front end of said frame, a slide movably mounted on said frame to move towards said tree, an engine driven saw on said slide for cutting said tree, and hydraulic means for moving said slide towards said tree, said hydraulic means being characterized by a cylinder and piston arranged between said frame and slide, and a means driven by the mechanism for driving said engine driven saw for supplying hydraulic fluid to said cylinder under pressure comprising a tank containing a supply of fluid, and a pump connected in a pipeline between said tank and cylinder and driven by the mechanism for driving said saw.

3. A power saw for felling and cutting up pulpwood, comprising a frame with wheels for being moved along the ground, a clamp for clamping about a tree and mounted on the front end of said frame, a slide movably mounted on said frame to move towards said tree, an engine driven saw on said slide for cutting said tree, and hydraulic means for moving said slide towards said tree, said hydraulic means being characterized by a cylinder and piston arranged between said frame and slide, and a means driven by the mechanism for driving said engine driven saw for supplying hydraulic fluid to said cylinder under pressure comprising a tank containing a supply of fluid, and a pump connected in a pipeline between said tank and cylinder and driven by the mechanism for driving said saw, said pipeline includes branches from said pump to opposite ends of said cylinder, and a valve for connecting either of said branches to said pump to supply fluid to one end or the other of said cylinder to force said piston one way or the other.

JOHN IRWIN, Jr.